United States Patent

Percebois et al.

[11] Patent Number: 6,062,611
[45] Date of Patent: May 16, 2000

[54] LOCKED PIPE JOINT AND SPLIT METAL RETAINING RING THEREFOR

[75] Inventors: Alain Percebois, Blenod les Pont-A-Mousson; Francois Maire, Vandieres; Roland Zacharie, Pont a Mousson, all of France

[73] Assignee: Pont-A-Mousson SA, Cedex, France

[21] Appl. No.: 09/056,824

[22] Filed: Apr. 8, 1998

[30] Foreign Application Priority Data

Apr. 9, 1997 [FR] France ................................ 97 04355

[51] Int. Cl.[7] ...................................................... F16L 21/02
[52] U.S. Cl. ........................ 285/374; 411/517; 411/518; 285/321; 285/232
[58] Field of Search ...................................... 411/517, 518, 411/526, 525; 285/321, 231, 232, 233, 337, 374

[56] References Cited

U.S. PATENT DOCUMENTS

| | | | |
|---|---|---|---|
| Re. 18,144 | 8/1931 | Heiermann | 411/518 |
| 2,883,899 | 4/1959 | Bluth | 411/518 |
| 2,902,303 | 9/1959 | Davis | 411/517 |
| 3,446,522 | 5/1969 | Hoard | 411/518 |
| 3,884,510 | 5/1975 | Bram | 285/321 |
| 4,006,659 | 2/1977 | Wurzel et al. | 411/518 |
| 4,082,321 | 4/1978 | Nakajima et al. | 285/321 |
| 4,097,074 | 6/1978 | Nagao et al. | 285/321 |
| 4,183,280 | 1/1980 | Hashimoto . | |
| 4,194,769 | 3/1980 | Bram | 285/321 |
| 4,281,601 | 8/1981 | Overman | 285/321 |
| 4,540,204 | 9/1985 | Battle et al. | 285/374 |
| 4,606,559 | 8/1986 | Rammelsberg | 285/374 |
| 4,643,466 | 2/1987 | Conner et al. | 285/321 |
| 4,685,708 | 8/1987 | Conner et al. | 285/321 |
| 4,863,199 | 9/1989 | Hojo et al. | 285/321 |
| 4,886,304 | 12/1989 | Kunsman . | |
| 5,022,687 | 6/1991 | Ariga | 285/321 |
| 5,197,768 | 3/1993 | Conner | 285/321 |

FOREIGN PATENT DOCUMENTS

| | | | |
|---|---|---|---|
| 294503 | 11/1971 | Germany . | |
| 2205000 | 8/1973 | Germany | 285/321 |
| 24 04 092 | 7/1975 | Germany . | |
| 27 30 611 | 8/1978 | Germany . | |
| 3117225 | 11/1982 | Germany | 285/321 |
| 94 10 418.2 | 9/1994 | Germany . | |
| 103249 | 12/1941 | Switzerland | 411/518 |
| 222019 | 6/1942 | Switzerland . | |
| 519570 | 6/1976 | U.S.S.R. | 285/321 |
| 922299 | 3/1963 | United Kingdom . | |

*Primary Examiner*—Eric K. Nicholson
*Attorney, Agent, or Firm*—Sughrue, Mion, Zinn, Macpeak & Seas, PLLC

[57] ABSTRACT

A locked pipe joint between a socket (3) of a first pipe (4), and a smooth end (1) of a second pipe (2) inserted in the socket with the interposition of an annular sealing gasket (5). The joint includes a raised bead (6) integral with the smooth end, a split metal retaining ring (7), and a rear support surface (9) for the split ring. The split ring includes a series of indentations (19) on the circumference of at least one face (16), in which the indentations are configured to allow the necessary diametric contraction of the ring by the crossing of its ends, and the subsequent expansion of the ring to lock the joint.

23 Claims, 3 Drawing Sheets

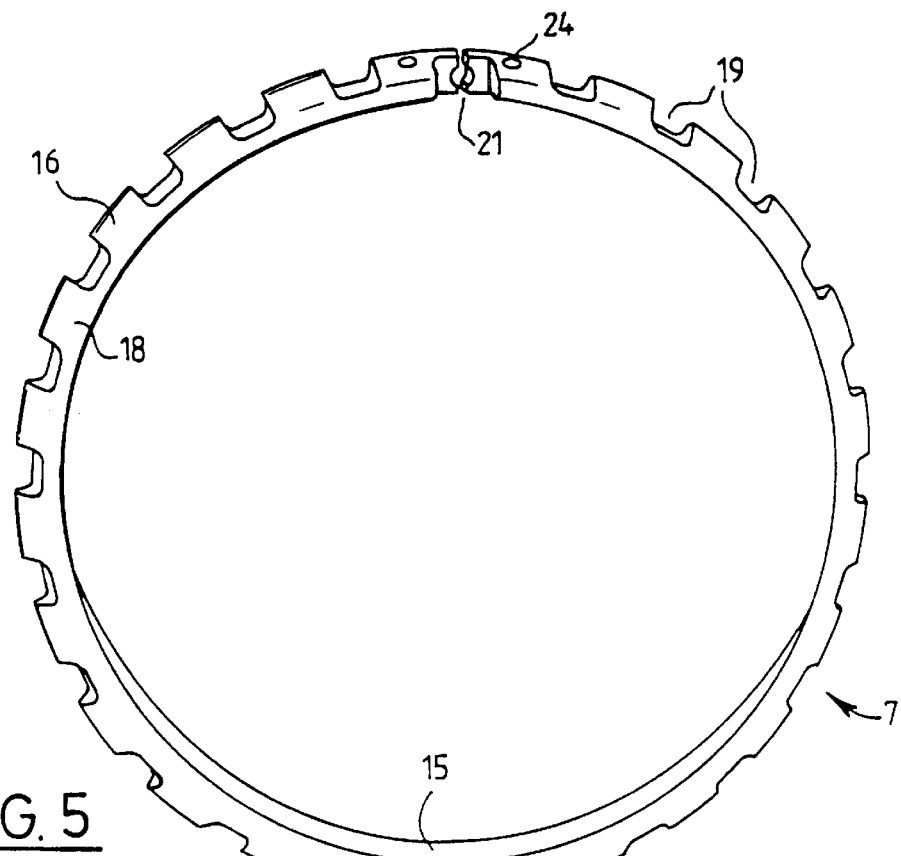
FIG. 5
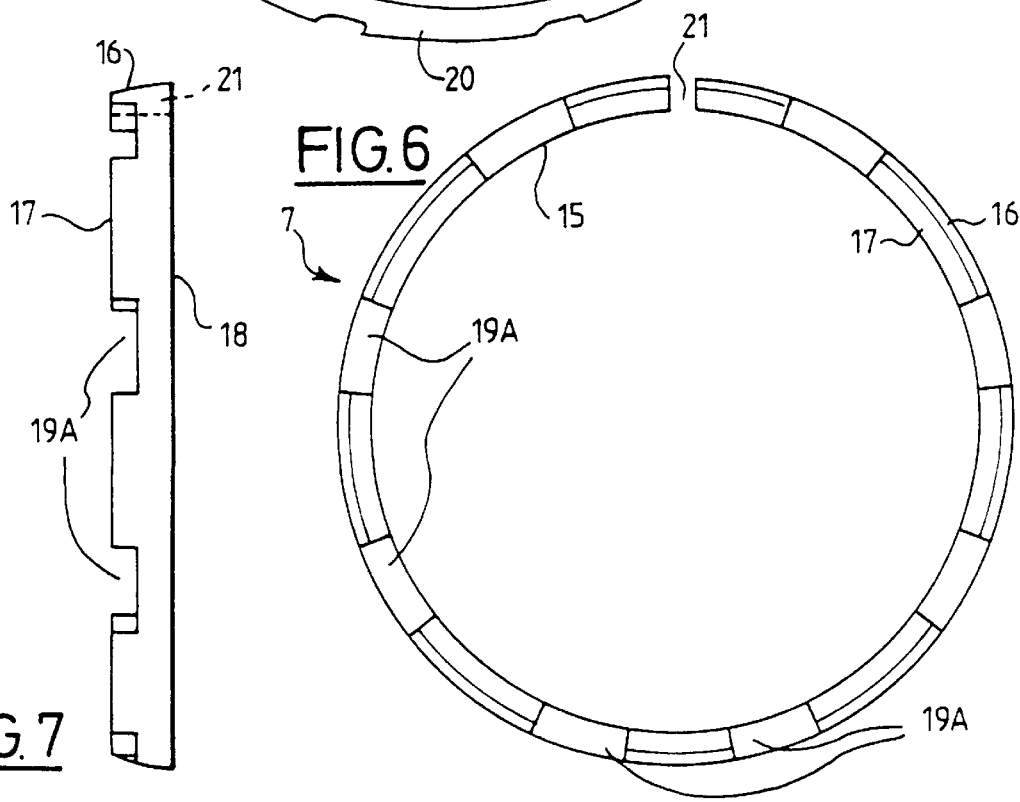
FIG. 7
FIG. 6

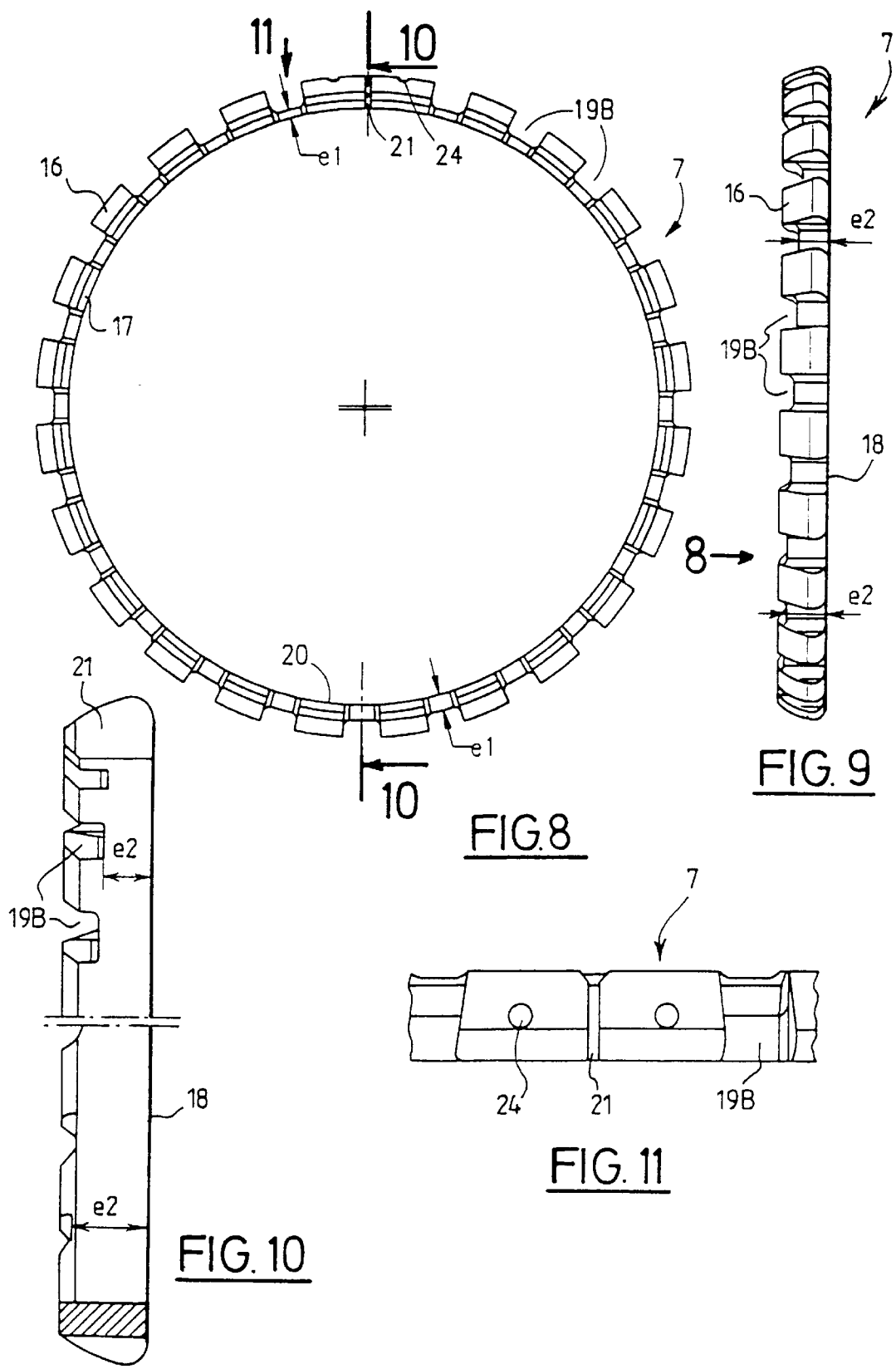

LOCKED PIPE JOINT AND SPLIT METAL RETAINING RING THEREFOR

BACKGROUND OF THE INVENTION

This invention relates to a locked joint between pipe system components, in particular between pipes, and to a split metal retaining ring usable in a joint of this kind.

The pipe system components may be not only pipes, but also pipe system accessories, such as fittings. It will be assumed that the following description applies to pipes.

A locked joint between pipes is a fluid-tight assembly that can withstand dislocating forces that are generated when the pipe system is placed under pressure. A locked joint typically comprises a socket of a first pipe, a smooth end of a second pipe inserted in the socket with the interposition of an annular sealing gasket, a raised bead integral with the smooth end, a split retaining ring arranged around the smooth end just to the rear of the raised portion, and a rear support surface for the retaining ring integral with the socket.

The rear support surface for the retaining ring may be a mating flange at the entry to the socket. In this case, assembling the joint merely requires that the retaining ring be able to open or expand, thus allowing it to pass over the raised bead of the smooth end. In other configurations, however, the rear support surface forms a part of the socket itself and is positioned in front of an entry flange of the socket. The retaining ring must, in this case, be capable of sufficient contraction to pass under the entry flange of the socket.

One technique used to achieve sufficient contraction of the retaining ring so that it can pass over the entry flange consists in crossing the ends of the ring using an appropriate tool. This crossing arrangement requires a certain degree of flexibility of the ring, in particular under torsion.

When the diameter of the pipes is large, for example greater than or equal to 400 mm, the retaining ring may be made of metal, since the requisite elastic ductility is naturally obtained using conventional sections.

On the other hand, when small diameter pipes (<400 mm) are used, the rigidity of a metal retaining ring becomes such that more flexible materials, such as plastomers, must be employed. However, although easily deformable, a locking ring made of a plastic material raises the problem of exhibiting poor pressure-resistance when the pipe system is in use. This invention is thus intended to supply a locked joint incorporating a split metal retaining ring usable within a broad range of diameters of the pipe system components, while ensuring good pressure-resistance.

SUMMARY OF THE INVENTION

To this end, the invention relates to a locked pipe joint having a split metal retaining ring formed with a plurality of circumferential notches or indentations to impart to it both a significant capacity to transmit axial forces and significant elastic ductility.

BRIEF DESCRIPTION OF THE FIGURES

FIG. 5 is a perspective view of a variant of the retaining ring in FIGS. 2 to 4;

FIG. 6 is a view, similar to FIG. 2, of another embodiment of the retaining ring according to the invention;

FIG. 7 is a schematic side view of the retaining ring in FIG. 6;

FIG. 8 is a front view of a third embodiment of the retaining ring according to the invention;

FIG. 9 is a side view of the retaining ring in FIG. 8;

FIG. 10 is a cross-section along line 10—10 in FIG. 8; and

FIG. 11 is a partial view in the direction of the arrow 11 in FIG. 8.

DETAILED DESCRIPTION OF THE PREFERRED EMBODIMENTS

Figure 1:
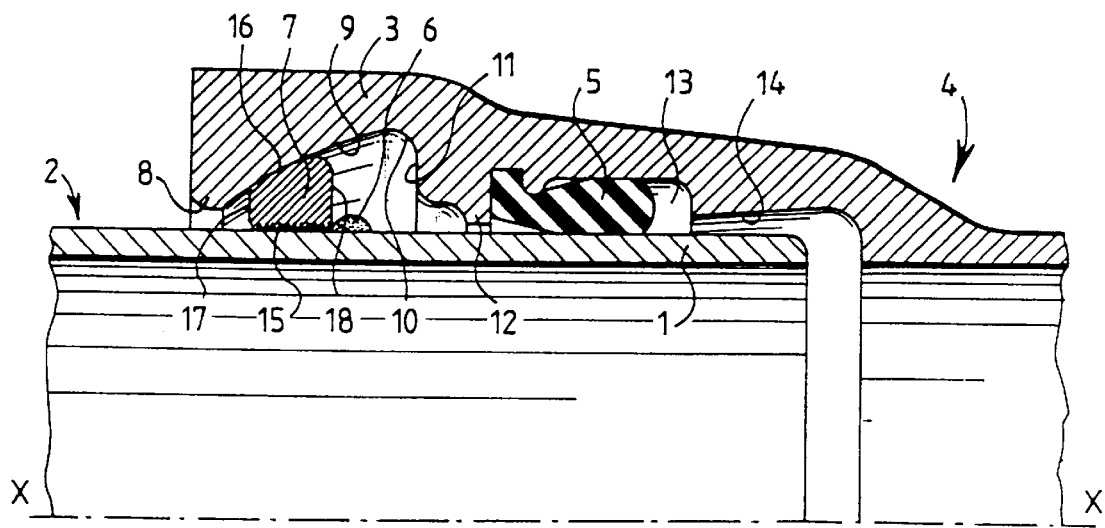
FIG. 1 is a half-view in longitudinal cross-section of a locked joint according to the invention.

The locked joint illustrated in FIG. 1 is of the type described in commonly assigned Patent No. FR-A-2 505 014, except as regards the structure of the retaining ring. It comprises a smooth end 1 of a first pipe 2 of a pipe system, a socket 3 of a second pipe 4 of the system, a radial-compression gasket 5, a weld bead 6 (or, in a variant, an integrally-cast raised stop) surrounding at least partially the smooth end and lying in a plane intersecting the latter, and a retaining ring 7. The two pipes 2 and 4 are made of lamellar or spherulitic graphite cast iron, the retaining ring 7 is made of metal, for example also of lamellar or spherulitic graphite cast iron, and the gasket 5 is made of elastomer. The two pipes are shown perfectly aligned along a shared axis X—X.

Going from back to front, that is, beginning at the inlet thereof, the socket incorporates internally an inlet flange 8 whose diameter is appreciably greater than that of the smooth pipe end; a retaining cavity which delimits a domed rear support surface 9, this surface connecting by means of a rounded segment 10 to a front flat, transverse wall 11 of the cavity; a flange 12 for guiding the smooth end; a cavity 13 designed to house and hold the gasket 5 in position; and a final recess 14 which houses the tip of the smooth end.

The retaining ring 7 is a split ring whose conventional solid section having a convex profile is generally trapezoidal in shape and incorporates a radially-interior cylindrical face 15, potentially toothed or knurled as illustrated in FIG. 1; a convex radially-exterior surface 16; a small rear flat, transverse face 17; and a large front flat, transverse face 18. When in use, as illustrated, the front face 18 abuts against the weld bead 6, and the exterior face 16 is pressed on the surface 9, thereby allowing angular clearance between the two pipes.

Figures 2, 3, 4:
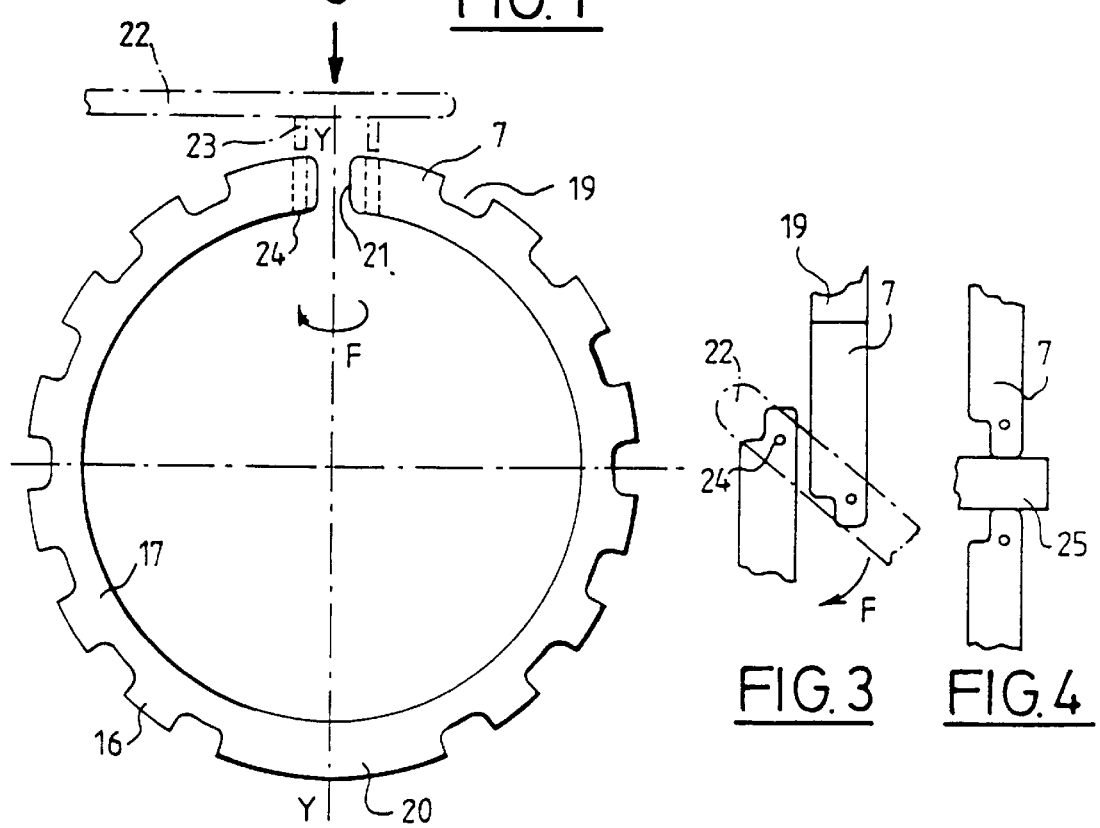
FIG. 2 is a schematic front view of the locking ring of the joint.
FIG. 3 is a partial schematic view in the direction of the arrow 3 in FIG. 2, illustrating the contraction of the retaining ring in order to allow the insertion thereof in the socket.
FIG. 4 is a view similar to FIG. 3, illustrating the expansion of the retaining ring prior to the insertion of the smooth end in the socket.

In the embodiment in FIG. 2, the split ring 7 incorporates around its circumference a series of radial indentations 19 of constant width cut in the surface 16. Each indentation has generating lines parallel to the axis X—X and opens onto the two faces 17 and 18. In this example, the indentations are spaced apart nearly evenly on the circumference, with the exception of the ring area 20 diametrically opposite the split 21, this area 20 containing no indentation.

The presence of the indentations 19 markedly increases the circumferential pliability of the ring in the area of the split 21, while allowing the ring to preserve a high level of resistance to axial forces when the pipe system is in operation. Accordingly, to insert the ring in the socket, conventional use is made of a lever 22 equipped with two points 23, which are illustrated in dot-and-dash lines in FIGS. 2 and 3.

The two points are inserted in the corresponding radial holes 24 provided on either side of the split 21, and the lever is made to rotate around the radial axis Y—Y of the split (arrow F in FIGS. 2 and 3). In this way, the two ends of the ring are brought side by side with each other (FIG. 3). This operation reduces the outer diameter of the ring sufficiently to allow it to pass under the inlet flange 8 at the beginning of the joint-mounting procedure.

Next, the tool 22 is removed and, using another conventional tool (not shown), the two ends of the ring are moved away from each other, and a shim 25 is placed between them (FIG. 4). At this point, the inner diameter of the ring is greater than the outer diameter of the weld bead 6, thus making it possible to insert the smooth pipe end into the socket through the flange 8, the expanded retaining ring, the flange 12, and the gasket 5 by compressing the latter radially. The weld bead 6 is then positioned in the inlet cavity of the socket and in front of the ring 7.

Finally, the shim 25 is removed, so that the ring contracts elastically and grips the smooth end by means of the surface 15, and the smooth end is pushed back so that the face 16 of the ring is pressed against the surface 9 of the socket. Then, by sliding on the smooth end, the front face 18 of the ring is pressed against the weld bead. The joint is then completely mounted.

In a variant (FIG. 5), the depth of the indentations may decrease gradually as they extend from the area of the split 21 to the area 20 diametrically opposite it. This makes it possible to equalize substantially, over the entire circumference of the ring, the stresses generated on the metal composing the ring when the deformations described above occur.

In another variant, the indentations 19 may be made in the inner face 15 of the ring, or in both the faces 15 and 16, in which case they are preferably alternated on the circumference.

If, for a given diameter, the ring has a large axial thickness, the presence of the radial indentations 19 by themselves may make it possible to expand or reclose the split 21. This is sufficient when the rear support surface for the ring belongs to a mating flange at the socket inlet, but does not make it possible to reach the position of torsional/flectional distortion in FIG. 3 necessary to insert the ring in the socket, as in FIG. 1.

In this case, to reach the position in FIG. 3, use may be made of the split retaining ring in FIGS. 6 and 7, which differs from the preceding one in that the indentations 19A are axial or frontal indentations cut in an end face of the retaining ring, preferably in the rear face 17, as illustrated. Furthermore, the indentations are evenly spaced over the entire circumference, including in the area 20. However, no indentation exists in the area diametrically opposite the split 21. These indentations 19A, which have substantially radial generating lines, open radially onto the surfaces 15 and 16.

The indentations 19A increase considerably the torsional/flectional pliability of the retaining ring, while allowing it to retain a high level of resistance to axial stresses when the pipe system is in service. As before, the depth of the indentations may decrease gradually as they extend from area 21 to the area 20, in order to make the stresses uniform.

In a variant or in an addition, indentations 19A may be made in the front face 18 of the retaining ring, potentially accompanied by the circumferential alternation mentioned above.

It will be understood that, for a given diameter, if the radial thickness of the ring is small, the presence of axial or frontal indentations 19A may suffice to reach the contracted position in FIG. 3. In the contrary case, however, it is necessary to have both radial and frontal indentations. These indentations may be distinct from each other, or they may be combined, as in the embodiment shown in FIGS. 8 to 11.

In this case, the combined indentations 19B are provided over the entire circumference of the retaining ring, including in the area 20. Each indentation is formed by a radial indentation 19 extended in the rear face 17 by an indentation 19A. Preferably, as shown, the depth of the indentations decreases gradually both axially and radially, going from split 21 to area 20. Consequently, the radial thickness of metal e1 remaining at the indentation bottoms increases gradually going from split 21 to area 20 (FIG. 8), and the same is true as regards the axial thickness of material e2 remaining at the indentation bottoms (FIGS. 9 and 10).

It should be noted that the connections of the indentation bottoms with the lateral indentation walls are preferably rounded in order to reduce fragility in these areas.

What is claimed is:

1. A locked joint between a socket of a first pipe, and a smooth end of a second pipe inserted in the socket with the interposition of an annular sealing gasket, the joint comprising:
    a raised bead integral with the smooth end;
    a split metal retaining ring arranged around the smooth end just behind said raised bead and installed by contraction and crossing of ends thereof in order to penetrate into the socket, then expansion in order to allow said raised bead to pass, and relaxation in order to clamp the smooth end; and
    a rear support surface for the retaining ring integral with the socket,
    wherein the retaining ring comprises, on the circumference of at least one face, a plurality of indentations configured to allow the contraction, crossing, and expansion of the retaining ring necessary to assemble the joint, wherein at least one indentation is cut in an axial end face of the retaining ring, extending into a radially-exterior surface of the ring and a radially-interior surface of the ring, which grips the smooth end.

2. A joint according to claim 1, wherein the indentations are produced solely in a radially-exterior face of the retaining ring.

3. A joint according to claim 1, wherein the indentations are cut solely in an axial rear end face of the retaining ring.

4. A joint according to claim 1, wherein the retaining ring comprises two series of indentations individually cut in two opposite faces, the two series of indentations being offset circumferentially in relation to each other.

5. A joint according to claim 1, wherein the retaining ring comprises at least one indentation cut in a radially-exterior face of the retaining ring, and at least one other indentation cut in an axial end face of the ring.

6. A joint according to claim 1, wherein at least one indentation extends within a radially-exterior face and in an axial end face of the retaining ring.

7. A joint according to claim 1, wherein the retaining ring comprises at least one first indentation located in an area diametrically opposite a split of the retaining ring, and at least one second indentation in proximity to the split and having a depth greater than that of said first indentation.

8. A joint according to claim 1, wherein an area of the retaining ring diametrically opposite a split thereof incorporates no indentation.

9. A joint according to claim 7, wherein the retaining ring comprises a series of indentations whose depths decrease gradually from the split to the diametrically opposite area.

10. A joint according to claim 1, wherein the depth of the indentations varies both radially and axially.

11. A joint according to claim 1, wherein a section of the retaining ring is solid and has a convex profile.

12. A joint according to claim 1, wherein the retaining ring comprises radial holes on either side of a split thereof.

13. A split metal retaining ring for a locked joint between two pipes, the retaining ring comprising:

a plurality of indentations, over a circumference of at least one face of the retaining ring, configured to allow deformations of the retaining ring necessary to assemble the joint; and at least one indentation being disposed in an axial end face of the retaining ring, extending into a radially-exterior surface of the ring and a radially-interior surface of the ring, designed to clamp a smooth end of one of the pipes.

14. A retaining ring according to claim 13, wherein the indentations are cut solely in an axial rear end face of the retaining ring.

15. A retaining ring according to claim 13, wherein two series of indentations are individually cut in two opposite faces, the two series of indentations being offset circumferentially in relation to each other.

16. A retaining ring according to claim 13, wherein at least one indentation is cut in a radially-exterior face of the retaining ring, and at least one other indentation is cut in an axial end face of the ring.

17. A retaining ring according to claim 13, wherein at least one indentation extends in a radially-exterior face and in an axial end face of the retaining ring.

18. A retaining ring according to claim 13, wherein the retaining ring comprises at least one first indentation located in an area diametrically opposite a split of the retaining ring, and at least one second indentation contiguous with the split and having a depth greater than that of said first indentation.

19. A retaining ring according to claim 13, wherein an area of the retaining ring diametrically opposite a split thereof incorporates no indentations.

20. A retaining ring according to claim 18, wherein the retaining ring comprises a series of indentations whose depth decreases gradually from the area of the split to the diametrically opposite area.

21. A retaining ring according to claim 13, wherein the depth of the indentations varies both radially and axially.

22. A retaining ring according to claim 13, wherein a section of retaining ring is solid and has a convex profile.

23. A retaining ring according to claim 13, wherein the retaining ring comprises radial holes on either side of a split thereof.

* * * * *